US008914623B2

(12) United States Patent
Yamazaki et al.

(10) Patent No.: US 8,914,623 B2
(45) Date of Patent: Dec. 16, 2014

(54) UTILIZATION OF THE SCREEN IMAGE INFORMATION OF A PRIMARY ENVIRONMENT FOR REPRODUCTION AND USER-INTERACTION IN A SECONDARY ENVIRONMENT

(75) Inventors: Mitsuhiro Yamazaki, Kanagawa-ken (JP); Seiichi Kawano, Kanagawa-ken (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 774 days.

(21) Appl. No.: 12/718,738

(22) Filed: Mar. 5, 2010

(65) Prior Publication Data

US 2011/0219225 A1  Sep. 8, 2011

(51) Int. Cl.
G06F 9/44  (2006.01)
G06F 1/32  (2006.01)
G06F 1/24  (2006.01)

(52) U.S. Cl.
CPC ..................................... *G06F 1/24* (2013.01)
USPC .............................................. 713/1; 713/300

(58) Field of Classification Search
CPC .................................. G06F 9/32; G06F 9/26
USPC .............. 713/1, 2, 300, 320, 340; 718/1, 104, 718/108
See application file for complete search history.

(56) References Cited

U.S. PATENT DOCUMENTS

| 7,356,677 | B1* | 4/2008 | Rafizadeh ......................... 713/1 |
| 2001/0029550 | A1* | 10/2001 | Endo et al. ..................... 709/319 |
| 2002/0099484 | A1* | 7/2002 | Kuragaki et al. ............... 701/36 |
| 2003/0154337 | A1* | 8/2003 | Ohno et al. ................... 710/260 |
| 2005/0066202 | A1* | 3/2005 | Evans et al. ................... 713/202 |
| 2007/0005947 | A1* | 1/2007 | Chartrand et al. ................ 713/1 |
| 2007/0277179 | A1 | 11/2007 | Suzuka |
| 2008/0052776 | A1* | 2/2008 | Prabhat et al. ................... 726/15 |
| 2008/0077786 | A1* | 3/2008 | Pierce et al. ...................... 713/2 |
| 2009/0100425 | A1* | 4/2009 | Russell ............................. 718/1 |
| 2009/0199132 | A1 | 8/2009 | Chong |
| 2009/0271594 | A1* | 10/2009 | Inoue et al. .................... 712/228 |
| 2010/0100706 | A1* | 4/2010 | Inoue et al. ..................... 712/30 |
| 2010/0122077 | A1* | 5/2010 | Durham ....................... 713/100 |
| 2010/0325405 | A1* | 12/2010 | Laue ................................ 713/2 |
| 2011/0093691 | A1* | 4/2011 | Galicia et al. .................... 713/2 |

FOREIGN PATENT DOCUMENTS

AU  EP 10166050.4  * 12/2008

* cited by examiner

*Primary Examiner* — Mohammed Rehman
*Assistant Examiner* — Phil Nguyen
(74) *Attorney, Agent, or Firm* — Shimokaji & Assoc., P.C.

(57) ABSTRACT

A method and apparatus is provided for switching between a primary computing environment and a secondary computing environment without changing the layout of a graphical user interface and a background display of the apparatus. A switching system switches operation between the primary computing environment and the secondary computing environment, switches a screen item between the primary computing environment and the secondary computing environment, and permits one of the primary and the secondary computing environments to go into a sleep state.

7 Claims, 7 Drawing Sheets

US 8,914,623 B2

UTILIZATION OF THE SCREEN IMAGE INFORMATION OF A PRIMARY ENVIRONMENT FOR REPRODUCTION AND USER-INTERACTION IN A SECONDARY ENVIRONMENT

BACKGROUND OF THE INVENTION

The present embodiment relates generally to user interfaces and plural computing environments, and more specifically, to switching from a primary computing environment to a secondary computing environment without a sudden change of a desktop image.

A portable computer such as a notebook-size personal computer (hereinafter referred to as a notebook PC) or a personal digital assistant (PDA) is usually powered with a battery. Nowadays, users of notebook PCs tend to work on one window with a plurality of open windows. Sometimes, users may also use more than one computing environment in a single PC.

Current heavy computing environments may require more energy to keep application windows running in comparison to light computing environments. One manner to curtail energy usage involves switching from one computing environment to another computing environment. Examples may be seen in HTC Shift products and Splashtop's Quickboot system. In switching between computing environments in those products, there is a change in the layout of the graphical user interface and a change in the background of the desktop image. Additionally, the above products cause a sudden change in image resolution between the computing environments.

Therefore, it can be seen that there is a need for a system and method to curtail energy usage and to maintain a user interface without a sudden change of a layout of the user interface and a background of a desktop of the system when switching between computing environments.

SUMMARY

In one aspect, an apparatus comprises a primary computing environment; a secondary computing environment; and a switching system that: switches operation of the apparatus between the primary computing environment and the secondary computing environment; switches a screen item between the primary computing environment and the secondary computing environment; and permits one of the primary and the secondary computing environments to go into a sleep state.

In another aspect, a method comprises switching operation between a primary computing environment and a secondary computing environment; switching a screen item between the primary computing environment and the secondary computing environment; and permitting one of the primary and the secondary computing environments to go into a sleep state.

In a further aspect, a computer readable medium having computer usable program code embodied therewith comprises computer program code configured to switch operation between a primary computing environment and a secondary computing environment; computer program code configured to switch a screen item between the primary computing environment and the secondary computing environment; and computer program code configured to permit one of the primary and the secondary computing environments to go into a sleep state.

These and other features, aspects and advantages of the present invention will become better understood with reference to the following drawings, description and claims.

DETAILED DESCRIPTION OF EMBODIMENTS

Figure 1:
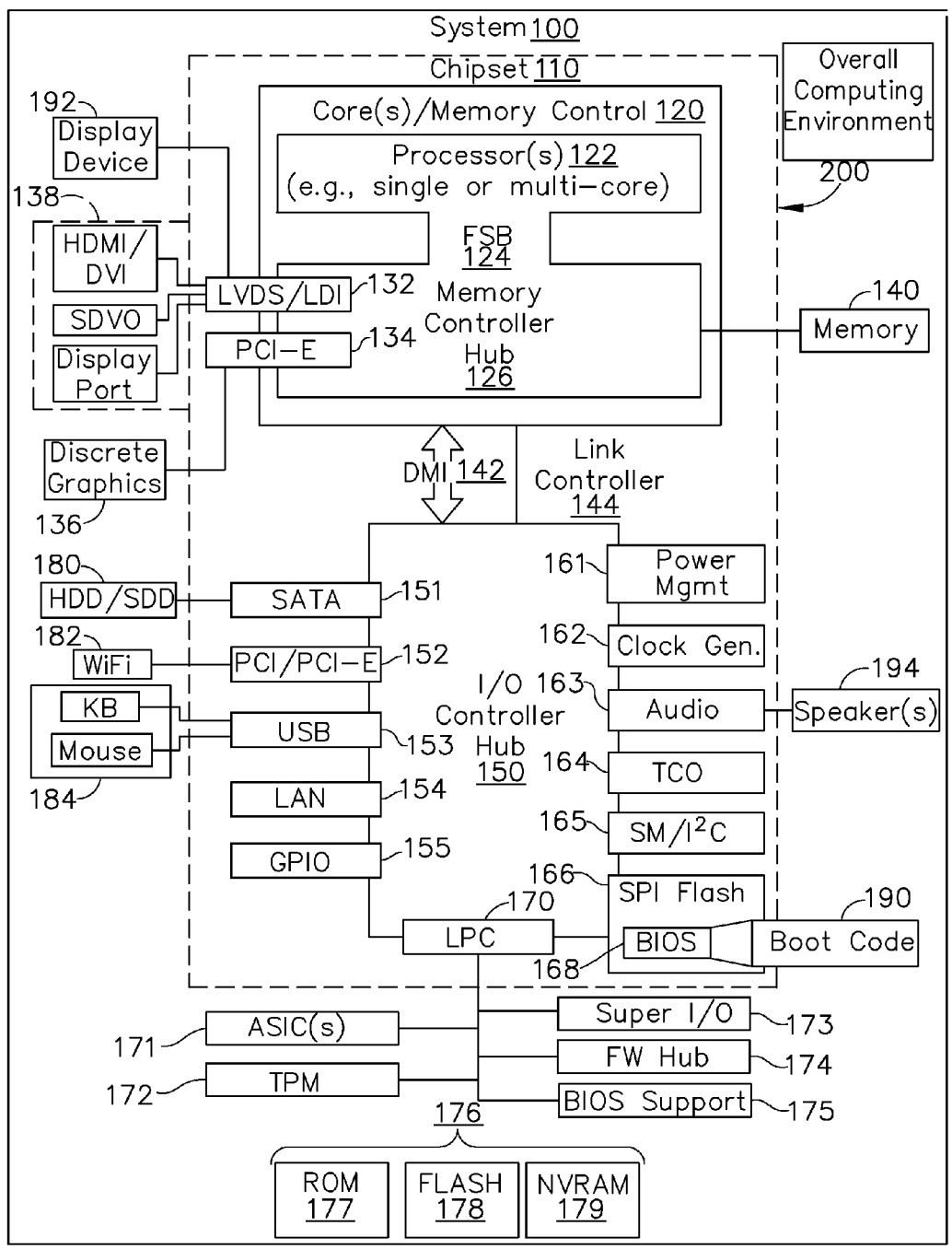
FIG. 1 is a hardware block diagram of an exemplary embodiment of a system.

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, the exemplary embodiments provide methods and systems for using a plurality of computing environments for quick boot and energy saving. The exemplary embodiments also provide methods and systems that facilitate smooth and transparent switching between a primary computing environment and a secondary computing environment without interrupting a user's thinking and changing a graphic user interface. The exemplary embodiments may employ a hybrid system or a virtualization system. In either the hybrid or virtualization system, the exemplary embodiments may include a switching system having one or more computer hardware and/or software systems which control switching between the primary computing environment and the secondary computing environment.

More specifically, the switching system may switch a screen item between the primary and secondary computing environments, such as an application, application data, an application window, a background display, and/or a pointer. The switching system may also capture or take a snapshot of the desktop screen images of at least one application window and/or a full-screen graphical background display. Another part of the switching system may receive the foregoing images. At this time, the overall computer system may be operating under the control of the secondary computing environment. In the event a user stops using the keyboard or the touch screen, for example, the primary computing environment may go into one of several sleep states. Sleep states may include, for example, a standby state, a hibernation state, and a soft off state. A display device or an input device may then be under the control of the secondary computing environment. Such control may continue until the switching system detects an event to switch to the primary computing environment. Such event may include a double click on a JPEG or PDF file, for example. Consequently, the secondary computing environment may go into one of several sleep states and the overall computer system may then be under the control of the primary computing environment.

Exemplary embodiments may take the form of an entire hardware embodiment, an entire software embodiment (including firmware, resident software, micro-code, etc.) or an embodiment combining software and hardware aspects that may all generally be referred to herein as a "circuit," "module" or "system." Furthermore, exemplary embodiments may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction performance system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireless, wireline, optical fiber cable, RF, etc.

Computer program code for carrying out operations of exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

The term "computing environment" is used herein to refer to the surroundings of a computer application, which may include, for example, a hardware system, an operating system, an application program, hardware devices, BIOS, firmware, software modules, and/or a shell for a user interface.

While various exemplary circuits or circuitry are discussed, FIG. 1 depicts a block diagram of an illustrative exemplary computer system 100. The system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 100.

The exemplary system 100 of FIG. 1 may include a so-called chipset 110 (a group of integrated circuits, or chips, that work together, chipsets) with an architecture that may vary depending on manufacturer (e.g., INTEL®, AMD®, etc.). The architecture of the chipset 110 can include a core and memory control group 120 and an I/O controller hub 150 that exchange information (e.g., data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 may include one or more processors 122 (e.g., single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 may interface with memory 140 (e.g., to provide support for a type of RAM that may be referred to as "system memory"). The memory controller hub 126 may further include a LVDS interface 132 for a display device 192 (e.g., a CRT, a flat panel, a projector, etc.). A block 138 can include some technologies that may be supported via the LVDS interface 132 (e.g., serial digital video, HDMI/DVI, display port). The memory controller hub 126 may also include a PCI-express interface (PCI-E) 134 that may support discrete graphics 136.

In FIG. 1, the I/O hub controller 150 can include a SATA interface 151 (e.g., for HDDs/SDDs 180, etc.), a PCI-E interface 152 (e.g., for wireless WiFi connections 182), a USB interface 153 (e.g., for input devices 184 such as keyboard, mice, cameras, phones, storage, etc.), a network interface 154 (e.g., LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (e.g., for speakers 194), a TCO interface 164, a system management bus interface 165, and SPI Flash 166, which can include BIOS 168 and boot code 190. The I/O hub controller 150 may include gigabit Ethernet support.

The system 100, upon power on, may be configured to execute boot code 190 for the BIOS 168, as stored within the SPI Flash 166, and thereafter process data under the control of one or more operating systems and application software (e.g., stored in system memory 140). An operating system may be stored in any of a variety of locations and accessed, for example, according to instructions of the BIOS 168. As described herein, a device may include fewer or more features than shown in the system 100 of FIG. 1.

Figure 2A:
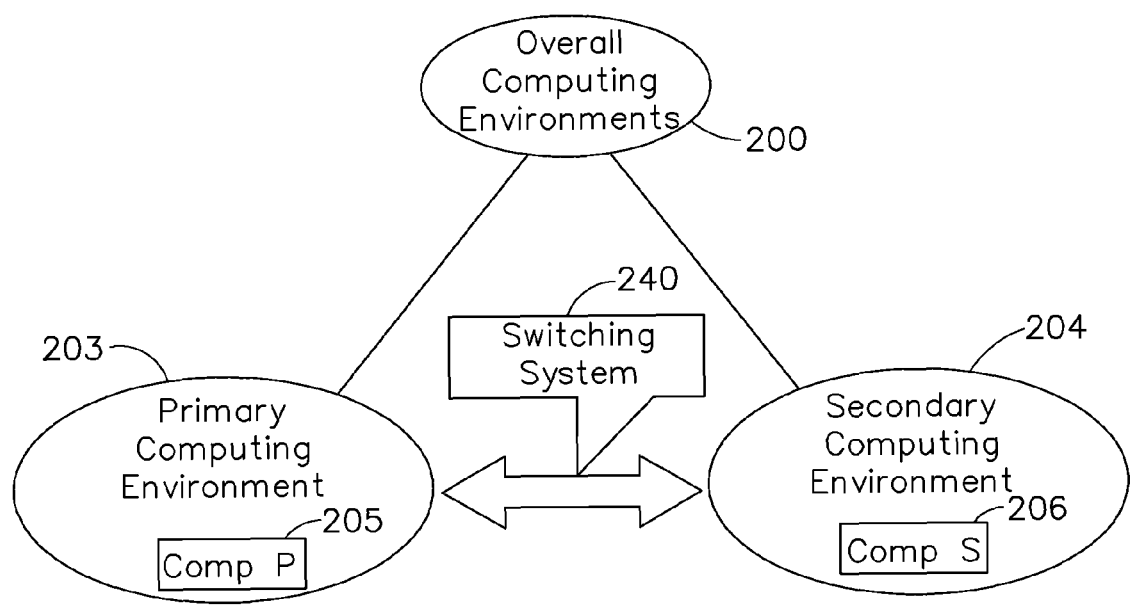
FIG. 2A is a block diagram illustrating an overall process of switching between computing environments according to an exemplary embodiment.

Referring to FIG. 2A, an exemplary embodiment of an overall computing environment 200 is depicted, such as one used in the computer system 100 shown in FIG. 1. Here, "overall computing environment" refers to the entire set of conditions under which a user operates a computer, as those conditions relate, for example, to the hardware, operating platform, or operating system. The overall computing environment 200 may comprise two computing environments: one may be a primary computing environment 203, and the other may be a secondary computing environment 204. Additionally, the primary computing environment 203 may be a main computing environment which may provide most commonly used features and application 208. On the other hand, the secondary computing environment may be a subsidiary computing environment which may provide less often used or specific features and application 210, such as for example, quick boot or energy savings. As will be further described below, the primary computing environment 203 and the secondary computing environment 204 may be switched back and forth smoothly and transparently. Herein, the terms "smoothly" and "transparently" are used interchangeably and are intended to mean a user does not have to reboot the computer system 100 to load another computing environment on demand. Consequently, when switching computing environments, a user may not experience sudden changes of a layout of a graphical user interface 400 (see FIG. 4A) and/or a background 401 (see FIG. 4A) of a desktop.

Broadly, the primary computing environment 203 can be a heavy weighted computing environment. The secondary computing environment 204 can be a light weighted computing environment which may not support all the applications or features that the primary computing environment normally supports. The primary computing environment 203 may include software which controls the primary operation and the allocation of general resources of the computer system 100. The secondary computing environment 204 may include software which controls the specific operation and the allocation of specific resources of the computer system 100. The overall computing environment 200 and the application programs may reside in memory system 140.

Figure 2B:
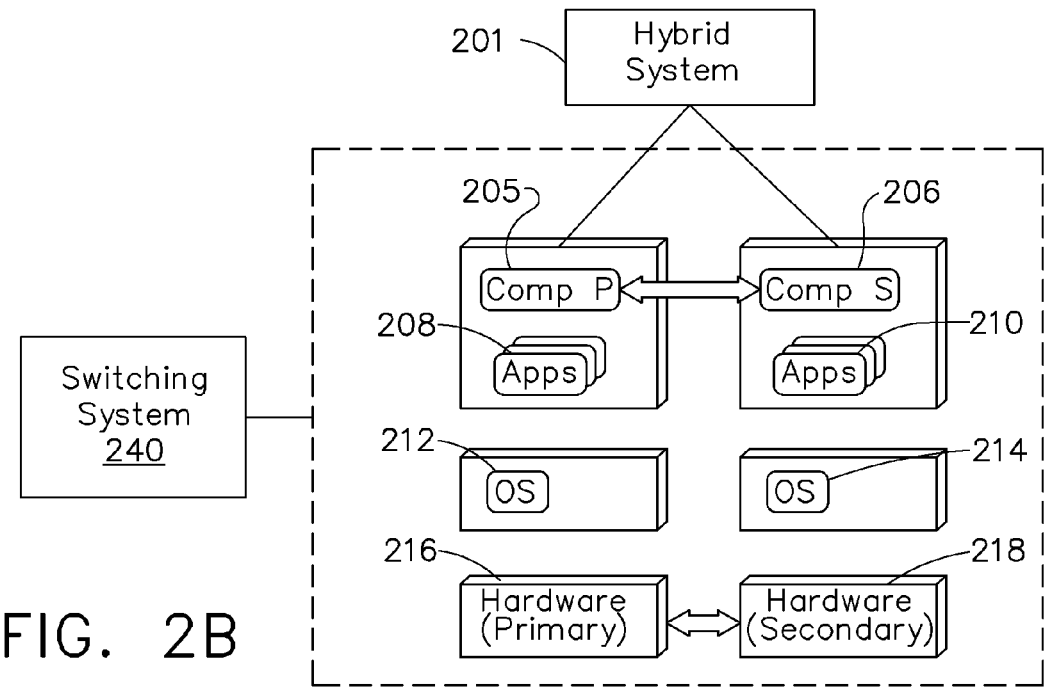
FIG. 2B is a schematic block diagram illustrating a hybrid system of the overall process of switching between computing environments shown in FIG. 2A according to an exemplary embodiment.

In FIG. 2B, a hybrid system 201 is depicted which is a more specific embodiment of the overall computing environment 200 of FIG. 2A. Here, in an exemplary embodiment, a "hybrid system" may refer to two or more heterogeneous processor systems which may be embedded into the computer system 100.

As shown in FIG. 2B, in an exemplary embodiment, there may be a component P 205 in the primary computing environment 203. The component P 205 may function to store the primary computing environment 203 as a part of the storage system 180, or it may be a part of the memory system 140, or it may be a part of the input or output system (I/O) 173. In other words, the component P 205 may be a part the chipset 110 which, in turn, may be a part of a computer hardware and/or software switching system 240. Similarly, there may also be a component S 206 in the secondary computing environment 204. The component S 206 may function to store the secondary computing environment 204 as a part of the storage system 180, or it may be a part of the memory system 140, or it may be a part of the input or output system (I/O) 173. In other words, the component S 206 may be a part of the chipset 110 which, in turn, may be a part of the switching system 240.

The component P 205 may communicate with the component S 206 via a physical connection, for example, a serial bus provided in the primary hardware 216 and the secondary hardware 218. In the hybrid system 201 shown in 2B, an operating system 212 or 214 may be an interface between the hardware 216 or 218 and a user. The operating system 212 or 214 may be responsible for managing and coordinating activities and sharing the resources of the system 100 that acts as a host for applications 208 or 210. The primary hardware 216 and the secondary hardware 218 may be physically connected as shown in FIG. 2B. The secondary computing environment 204 may be an embedded computing environment.

Figure 2C:
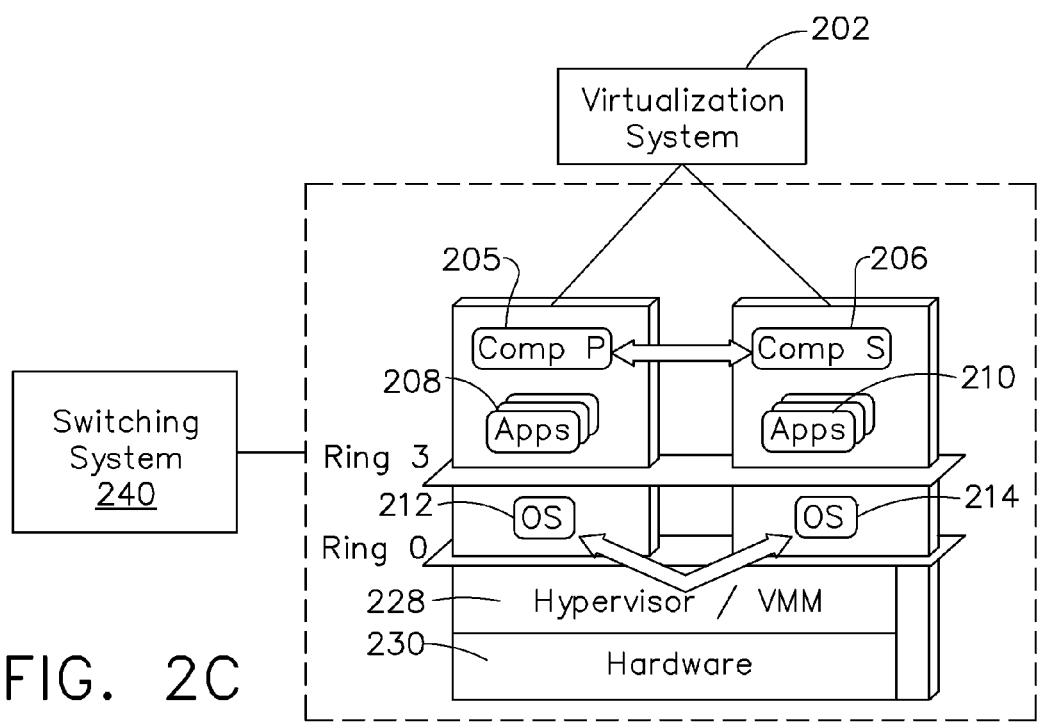
FIG. 2C is a schematic block diagram illustrating a virtualization system of the overall process of switching between computing environments shown in FIG. 2A according to an exemplary embodiment.

Alternatively, a virtualization system 202 depicted in FIG. 2C may be employed in place of the hybrid system 201 of FIG. 2B. Herein, a "virtualization system" refers to, in an exemplary embodiment, two logical computing environments existing on shared hardware. In the exemplary embodiment of FIG. 2C, the component P 205 may communicate with the component S 206 via a logical channel, for example, a hyper call of virtualization. The operating systems 212 or 214 may execute a partition of commonly shared hardware 230. A partition may be a logical unit of isolation that may be supported by a hypervisor 228, also called a virtual machine monitor (VMM). Applications 208 or 210 may run on the level of ring 3. In addition, the operating systems 212 or 214 may run on the level of ring O.

Figure 3:
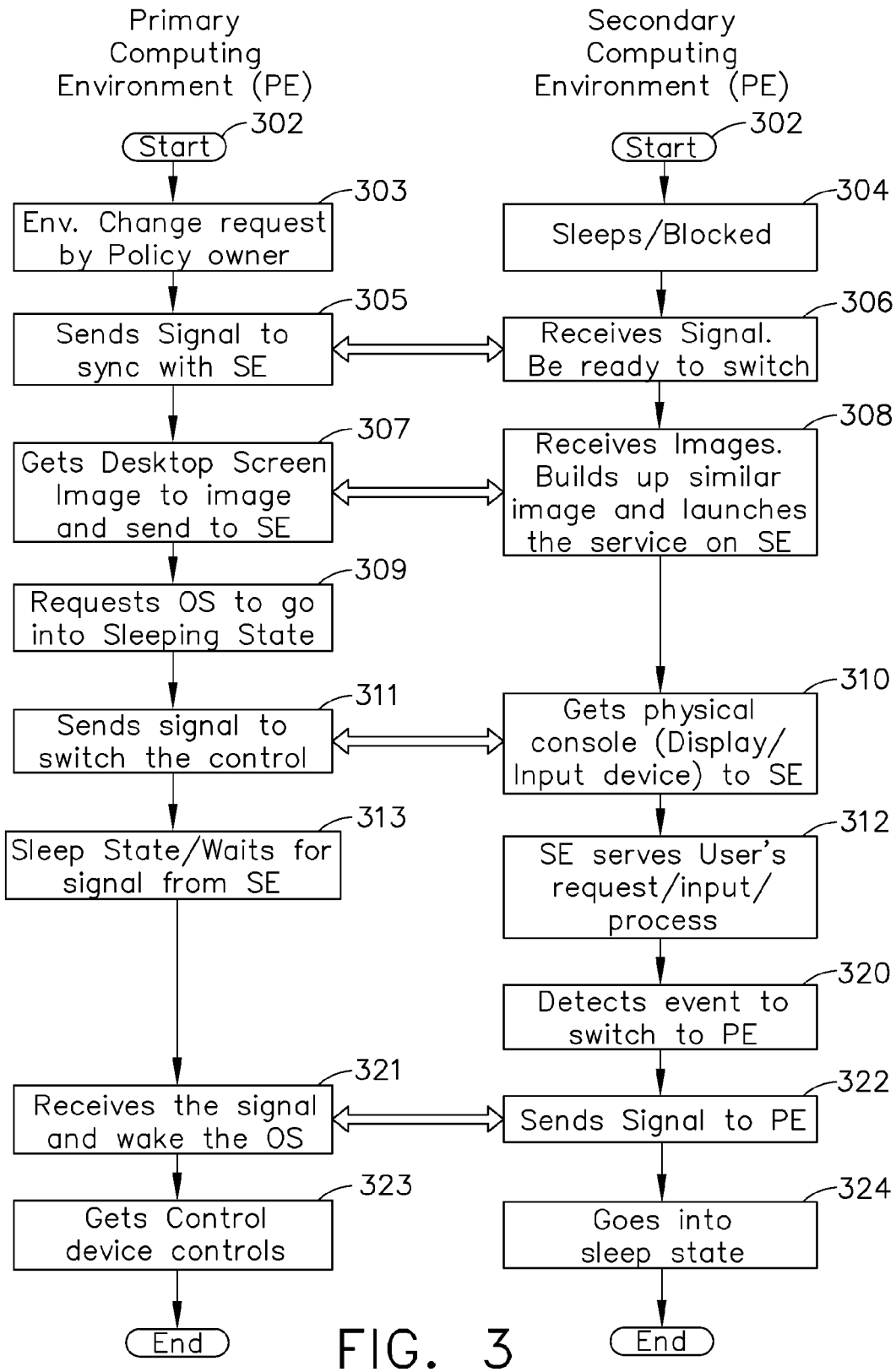
FIG. 3 is a flow chart illustrating steps of a method of switching between computing environments, such as that shown in FIGS. 2A-C, according to an exemplary embodiment.

FIG. 3 depicts the steps of a method according to an exemplary embodiment, such as that depicted in FIGS. 2A-2B. In the method of the exemplary embodiment, the primary computing environment 203 may be switched to the secondary computing environment 204. And, the secondary computing environment 204 may be switched to the primary computing environment 203 on demand.

As shown in FIG. 3, in a step 302, the system 100, according to instructions of the BIOS 168, may be started with the primary computing environment 203 and concurrently with the secondary computing environment 204. Since the secondary computing environment 204 may be light weighted compared to the heavy weighted primary computing environment 203, the system 100 may take less time to boot in comparison to booting under a typical computing environment, e.g. Windows®. In other words, the secondary computing environment 204 can display a user interface (UI) 400 (see FIG. 4A) quicker than a typical computing environment and without waiting for the primary computing environment 203, e.g. Windows®, to fully load.

Still referring to FIG. 3, in a step 303, the component P 205 may receive a request to change the computing environment from the primary computing environment 203 to the secondary computing environment 204. Such request may include an event that a user has stopped using the keyboard or the touch screen for a while. After booting in step 303, the secondary computing environment 204 may sleep or be blocked in a step 304.

In a step 305, the component P 205 may send a signal to sync with the component S 206. In a step 306, the component S 206 may receive the sync signal and get ready for a switch of a screen item which may, for example, be an application, application data, an application window, a background display, and/or a pointer. In a step 307, the component P 205 may capture or take an image (i.e., either active and/or inactive) of the screen item to be switched, store it in a memory 216, and then send the stored image to the component S 206.

In a specific example of step 307, the component P 205 may capture or take a snapshot of the desktop screen image(s) of one or more application windows 406 (see FIG. 4A) and/or a partial or full-screen graphical background display 401 (see FIG. 4A), store them in memory 216, and send them to the component S 206. In an exemplary embodiment, the full-screen display 401 may include a plurality of windows 406 displayed on the display device 192 (see FIG. 1) according to a front to back order wherein a window in front of other windows overlaps such other windows that are farther back in the order (see FIG. 4A). All windows may be displayed in a same area 408 occupied by the front (i.e., top) window in the display device 192. The images may further include a plurality of icons 404 (see FIG. 4B) which may be operative to launch application programs 208 or 210 on user activation.

Alternatively or in combination with the foregoing, step 307 may include keeping an application, such as the application 208, running while switching between computing environments. More specifically, images of windows of the application 208 together with application data from such images and pointers (which refer to how the application data may be saved) can be generated, stored in memory 216, and sent to component S 206.

In a step 308, the component S 206 may receive the image(s) of the screen item(s) from the component P 205 and may store them in the memory 218. The component S 206 may generate images which may be different from the images generated by the component P 205 and from the images stored in the memory 218. The images generated from component S 206 may be in the format of JPEG or PDF, for example.

Consequently in step 308, the component S 206 may launch an application, such as the application 210, which may be supported under the secondary computing environment. Application 210 may not have all the functions of application 208. For example, application 210 may be Microsoft Word® without an insert symbol function and application 208 may be Microsoft Word® with an insert symbol function. At this time, the system 100 may be operating under the control of the secondary computing environment 204 and enable the user to continue using application 210.

Step 308 may further include the step of generating dummy images 420 of the applications 208 and/or 210 under the primary computing environment which may be stored in the memory 216 when the applications 208 and/or 210 may or may not be supported by the secondary computing environment 204. Dummy images are like icons on the desktop. A user may launch a program by double clicking the dummy images 420. Dummy images 420 have existing application data, such as links, and related pointers which are programming language data type whose value points to another value stored elsewhere in the computer memory 216 using addresses of pointers.

Step 308 may further include the step of displaying images 406 on the display device without changing a layout of the graphical user interface and a background of a desktop of the apparatus. The "layout of the graphical user interface" refers to one or plural windows which may, for example, be in a front to back order wherein one window in front of other windows overlaps such other windows that are farther back in the order (see FIG. 4A). The background of a desktop is sometimes called "wallpaper" in the art. For example, a graphic image may be selected as the background of a desktop in place of the default background, which may be a solid color.

At step 308, the primary computing environment 203 is not in a sleep state. In the event a user stops using an input device, such as the keyboard or the touch screen, for a while, as an example, the component P 205 may request and permit the primary computing environment 203 to go into a sleep state in a step 309. In a step 310, the display device or an input device may be under the control of the secondary computing environment 204. Consequently, the component P 205 may send the component S 206 a signal to switch the overall computing environment 200 in a step 311. In a step 312, the secondary computing environment may then be responsible for managing and coordinating activities and sharing the resources of the system 100 that acts as a host for application 208 or 210. Furthermore, the component P 205 may sleep/wait for a signal from the component S 206 in a step 313.

Steps 312 and 313 may continue until component S 206 detects an event to switch to the primary computing environment. Such event may include a double click on a JPEG or PDF file for example. The component S 206 may detect the event to switch to the primary computing environment in a step 320. In a step 321, the component P 205 may receive the signal, which the component P 205 may send in a step 322, to switch and wake up the primary computing environment 203. Consequently, the secondary computing environment 204 may go into a sleep state in a step 324. In response, the component P 205 may wake up the primary computing environment 203 and the primary computing environment 203 becomes active. Consequently, the system 100 may be under the control of the primary computing environment 203 in a step 323.

Figure 4A:
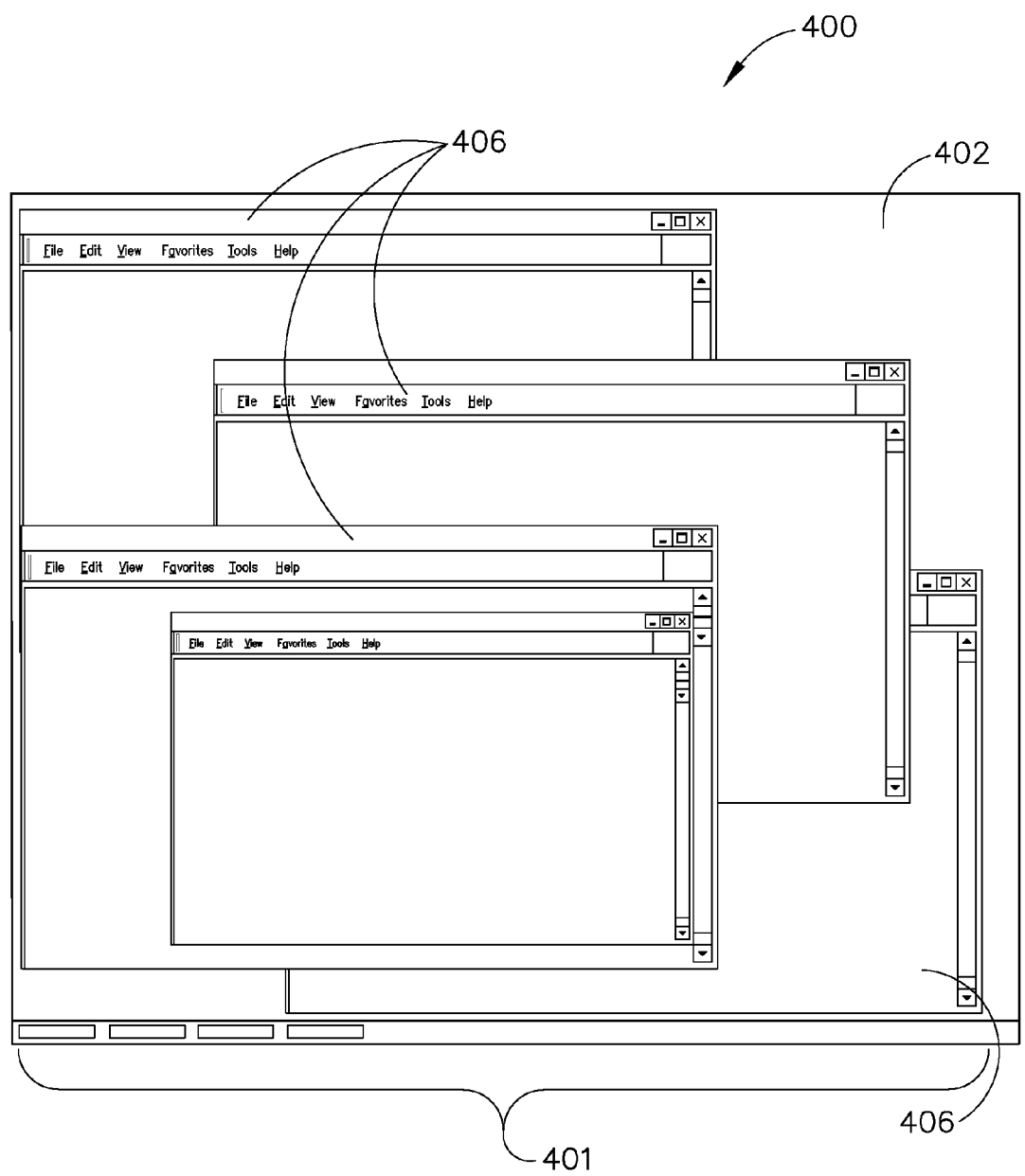
FIG. 4A shows a screenshot of a plurality of windows displayed on a display device according to an exemplary embodiment.
Figure 4B:
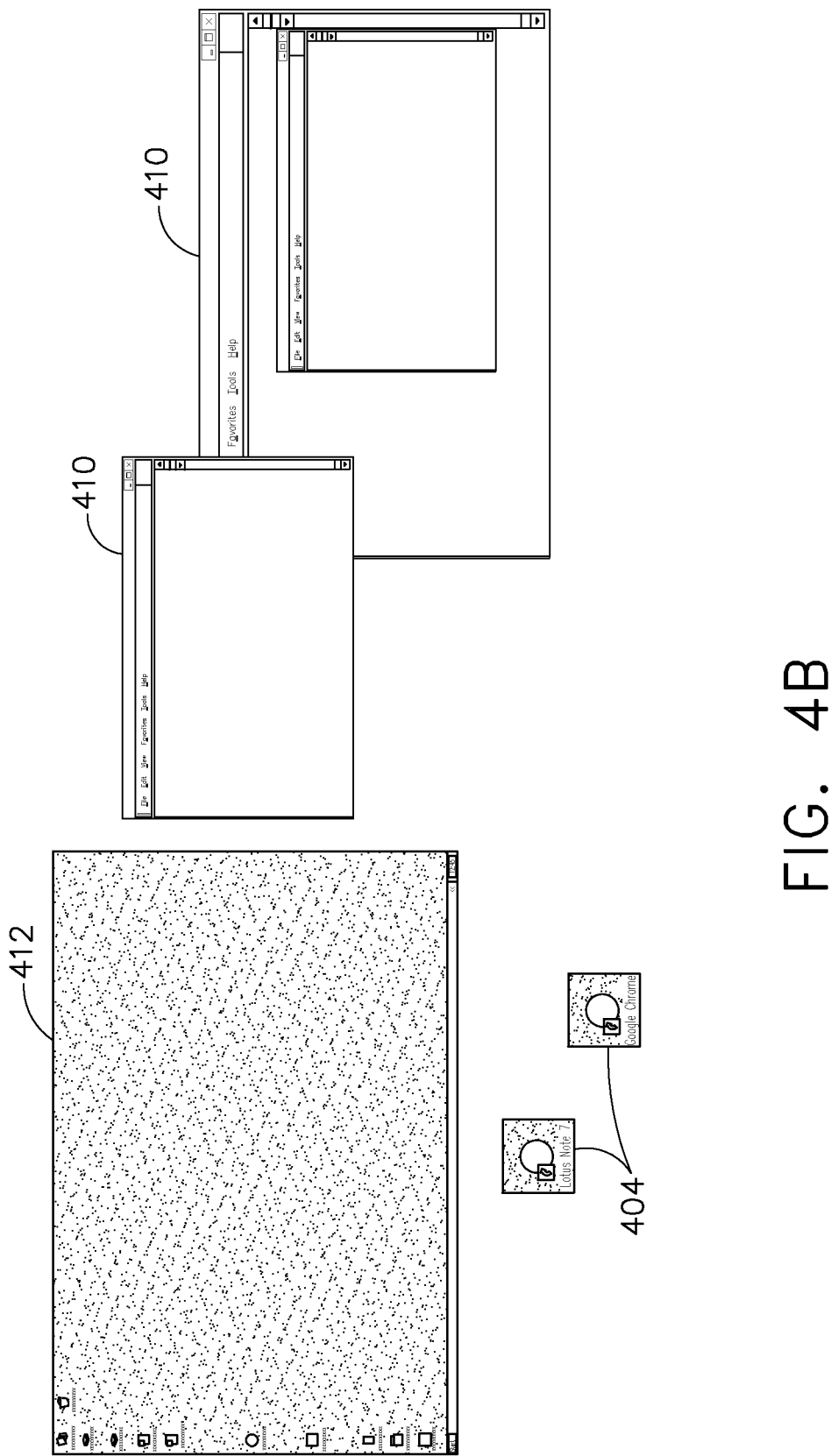
FIG. 4B shows separate multiple window screenshots of FIG. 4A including icons and a graphical background display under a primary computing environment according to an embodiment.
Figure 4C:
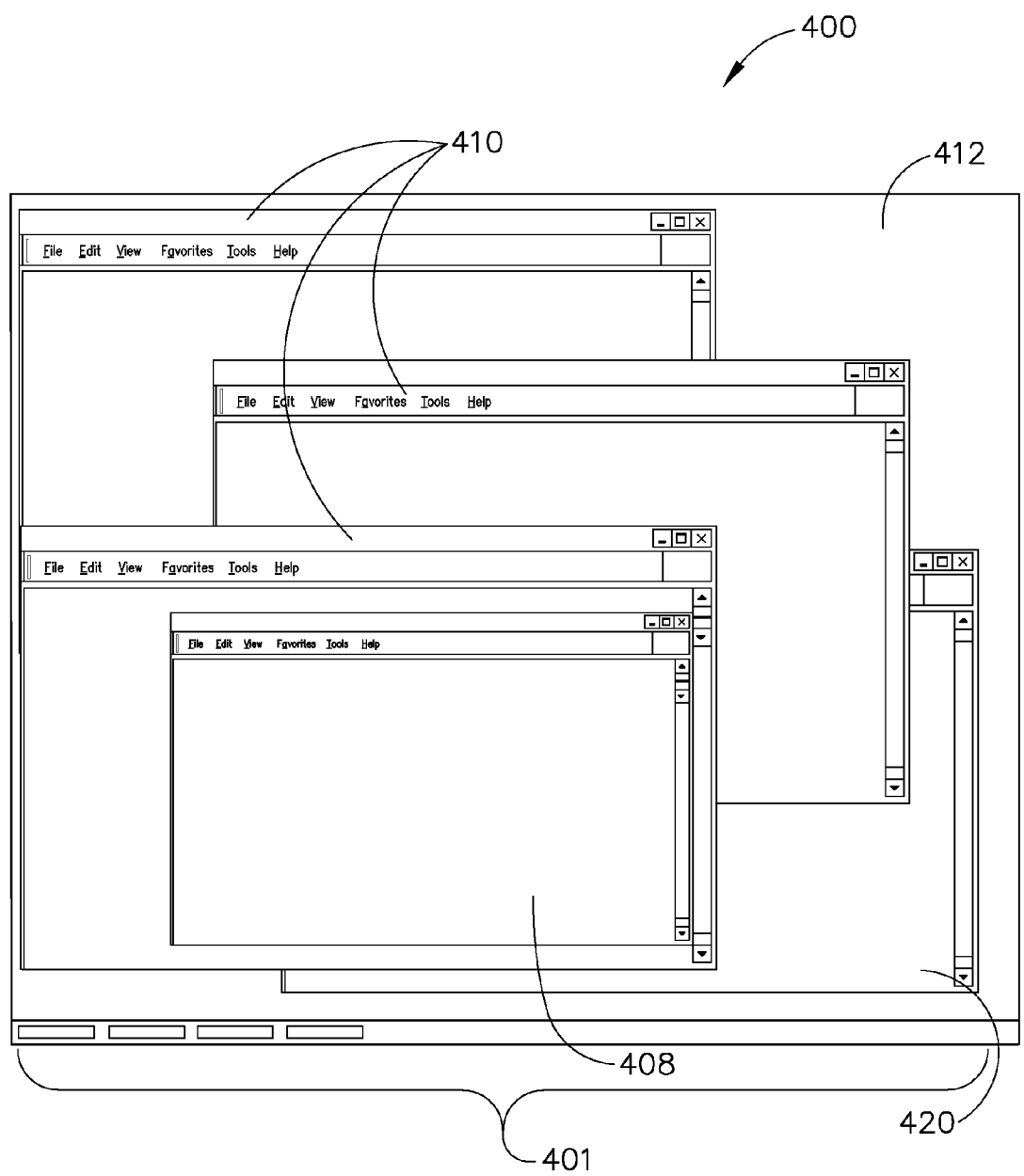
FIG. 4C shows multiple windows and a graphical background in the format of JPEG or PDF of images reproduced from FIGS. 4A and 4B under a secondary computing environment according to an embodiment.

FIGS. 4A-4C depict screenshots of how, in an exemplary embodiment such as that depicted in FIGS. 1 through 3C, an embodiment looks on the display device 192 viewed by a user. Referring to FIG. 4A, a plurality of windows 406, as an example, are displayed on the display device in a layout of a graphical user interface, which may, for example, be a front to back order wherein a window towards the front of the order overlaps windows farther back in the order, all of which are displayed in a same area of user interface 400 of the display device 192.

FIG. 4B shows separate multiple window screenshots of FIG. 4A including icons 404 and a graphical background display 412 under a primary computing environment 203 according to an embodiment. The multiple window screenshot images 406 may be stored in the memory 216 under the control of the primary computing environment 203 and may be sent to the memory 218 under the control of the secondary computing environment 204.

FIG. 4C shows multiple window images 410 and graphical background image 412 reproduced from FIGS. 4A and 4B under a secondary computing environment. These images 410 and 412 may be in JPEG or PDF format, and may be still or inactive images, as opposed to active ones. Typically, a user may execute a command on an active window image. Still images, on the other hand, like photos, do not enable a user to execute a command.

Alternatively, window images 410 and/or 412 may be active images. A user may execute a command on the images 410 and/or 412. As an example, a user may browse a website or use Skype™ before a switch between one computing environment and another computing environment. After the switch, the user may still browse the website or use Skype™ by using the application window image 410 under the other computing environment.

In other words, when an application 208 under the primary computing environment 203 is replaced by an application 210 under the secondary computing environment 204, the application window image 410 is shown in the same size, at the same position relative to the background display window image 412, and with the same stacking order in comparison to what a user would see in the primary computing environment. In addition, the application 210 and the application 208 may be operated by a user in the secondary computing environment 204.

Thus, in the present embodiment, a user may not be able to discern a difference in terms of size, position, and stacking order between the active window images 406 under the control of the primary computing environment 203 and the inactive window images 410 under the control of the secondary computing environment 204; thus the switch between the primary computing environment 203 to and from the secondary computing environment 204 is smooth and transparent, and may not interrupt the user's thinking.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood, of course, that the foregoing relate to exemplary embodiments of the invention and that modifications may be made without departing from the spirit and scope of the invention as set forth in the following claims.

We claim:

1. An apparatus, comprising:
   a primary operating system computing environment including a first switching component configured to receive a first switching signal;
   a secondary operating system computing environment including a second switching component configured to receive a second switching signal; and
   a switching system that:
   provides a synchronization signal between the first switching component to the second switching component;
   switches operation of the apparatus between the primary operating system computing environment and the secondary operating system computing environment;
   captures a full-screen graphical background display of the primary operating system computing environment;
   displays the captured full-screen graphical display of the primary operating system computing environment in the secondary operating system computing environment while placing the primary operating system computing environment into a sleep state; and
   reverts display back to the primary operating system computing environment in response to a user clicking an object in the captured full-screen graphical display displayed in the secondary operating system computing environment;
   wherein the switching system is configured to keep an application running while switching between the primary operating system computing environment and the secondary operating system computing environment.

2. The apparatus of claim 1, wherein the screen item is one of an application, application data, an application window, a background display, and a pointer.

3. The apparatus of claim 1, wherein the switching system comprises two heterogeneous processor systems.

4. The apparatus of claim 1, wherein the switching system comprises two logical computing environments existing on shared hardware.

5. The apparatus of claim 1, wherein the captured full-screen graphical display displayed in the secondary operating system computing environment includes each object displayed in the captured full- screen graphical display of the primary operating system computing environment.

6. The apparatus of claim 1, wherein during the display of the captured full-screen graphical display in the secondary operating system computing environment the apparatus is under control of the secondary operating system computing environment.

7. A method comprising:
   providing a synchronization signal between a first switching component configured to receive a first switching signal in a primary operating system computing environment and a second switching component configured to receive a second switching signal in a second operating system computing environment;
   capturing a full-screen graphical background display of the primary operating system computing environment;
   switching operation from the primary operating system computing environment to the secondary operating system computing environment;

displaying the captured full-screen graphical background display of the primary operating system computing environment in the secondary operating system computing environment;

placing the primary operating system computing environment into a sleep state; and reverting display back to the primary operating system computing environment in response to a user clicking an object in the captured full-screen graphical display displayed in the secondary operating system computing environment;

wherein the switching system is configured to keep an application running while switching between the primary operating system computing environment and the secondary operating system computing environment.

* * * * *